United States Patent
Kim et al.

(10) Patent No.: US 9,931,904 B2
(45) Date of Patent: Apr. 3, 2018

(54) AIR CONDITIONING SYSTEM FOR AUTOMOTIVE VEHICLES

(71) Applicant: HANON SYSTEMS, Daejeon (KR)

(72) Inventors: Tae Wan Kim, Daejeon (KR); Tae Yun Kong, Daejeon (KR); In Hyeok Kim, Daejeon (KR); Jeong Hun Seo, Daejeon (KR); Jae Hwan Jung, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 248 days.

(21) Appl. No.: 14/863,571

(22) Filed: Sep. 24, 2015

(65) Prior Publication Data

US 2016/0082804 A1    Mar. 24, 2016

(30) Foreign Application Priority Data

Sep. 24, 2014 (KR) .................. 10-2014-0127423
Sep. 24, 2014 (KR) .................. 10-2014-0127424

(51) Int. Cl.
B60H 1/00 (2006.01)

(52) U.S. Cl.
CPC ..... B60H 1/00028 (2013.01); B60H 1/00064 (2013.01); B60H 1/0075 (2013.01); B60H 1/00828 (2013.01); B60H 1/00842 (2013.01); B60H 1/00864 (2013.01); B60H 2001/002 (2013.01); B60H 2001/00092 (2013.01); B60H 2001/00099 (2013.01); B60H 2001/00114 (2013.01); B60H 2001/00192 (2013.01)

(58) Field of Classification Search
CPC ............ B60H 1/00064; B60H 1/00835; B60H 1/00842; B60H 2001/00192; B60H 2001/002; B60H 2001/0092
See application file for complete search history.

(56) References Cited

U.S. PATENT DOCUMENTS

| 4,794,537 | A | * | 12/1988 | Adasek | B60H 1/00814 237/5 |
| 5,725,052 | A | * | 3/1998 | Kawai | B60H 1/00064 165/203 |
| 6,192,698 | B1 | * | 2/2001 | Kakehashi | B60H 1/00064 165/203 |
| 9,102,215 | B2 | * | 8/2015 | Kumar | B60H 1/00742 |
| 2004/0007007 | A1 | * | 1/2004 | Petesch | B60H 1/00064 62/244 |

(Continued)

*Primary Examiner* — Devon Russell
(74) *Attorney, Agent, or Firm* — Shumaker, Loop & Kendrick, LLP; James D. Miller

(57) ABSTRACT

An air conditioning system for motor vehicles includes an air conditioner case having a left path, a right path and a rear seat path. A temperature door is configured to adjust a volume of a cold air or a hot air. A main blower is configured to blow the cold air or the hot air and an air volume distribution door is configured to control opening degrees of the left path and the right path. A rear seat auxiliary blower is configured to increase a volume and a pressure of the cold air or the hot air flowing through the rear seat path. A control unit is configured to, when an air volume distribution ratio of the main blower is changed, correct an opening position of the air volume distribution door and compensate a change in an air volume distribution ratio of the left path and the right path.

16 Claims, 4 Drawing Sheets

(56) References Cited

U.S. PATENT DOCUMENTS

| | | | |
|---|---|---|---|
| 2007/0137833 A1* | 6/2007 | Kang | B60H 1/00064 165/42 |
| 2009/0038774 A1* | 2/2009 | Ogiso | B60H 1/247 165/42 |
| 2010/0043470 A1* | 2/2010 | Kang | B60H 1/00064 62/239 |
| 2011/0005707 A1* | 1/2011 | Seto | B60H 1/00064 165/41 |
| 2011/0005734 A1* | 1/2011 | Nanaumi | B60H 1/00064 165/122 |
| 2011/0073273 A1* | 3/2011 | Seto | B60H 1/00064 165/42 |

* cited by examiner

AIR CONDITIONING SYSTEM FOR AUTOMOTIVE VEHICLES

CROSS-REFERENCE TO RELATED APPLICATIONS

This application claims priority to Korean Patent Application No. 10-2014-0127423 filed on Sep. 24, 2014 and Korean Patent Application No. 10-2014-0127424 filed on Sep. 24, 2014, the disclosures of which are incorporated herein by reference in their entirety.

FIELD OF THE INVENTION

The present invention relates to a three-zone-type air conditioning system for motor vehicles which is configured to independently cool and heat a left zone, a right zone and a rear seat zone of a vehicle room and, more particularly, to an air conditioning system for motor vehicles which is configured to actively correct an opening position of an air volume distribution door when at least one of an opening position of a temperature door and a rotation speed level of a rear seat auxiliary blower is changed. The air conditioning system is capable of actively coping with a change in a static pressure difference between left and right paths, which is attributable to the change in the opening position of the temperature door and in the rotation speed level of the rear seat auxiliary blower, and a resultant change in an air volume distribution ratio of the left and right paths. This enables the air volume distribution ratio of the left and right paths to be kept constant in the original state despite the change in opening position of the temperature door and in the rotation speed level of the rear seat auxiliary blower.

BACKGROUND OF THE INVENTION

In recent years, there is available a three-zone-type air conditioning system which is configured to independently cool and heat a left zone, a right zone and a rear seat zone of a vehicle room. In the three-zone-type air conditioning system, as illustrated in FIG. 1, a left path 14, a right path 16 and a rear seat path 18 are formed within an air conditioner case 10. Left, right and rear seat temperature doors 20, 22 and 24 are installed in the left path 14, the right path 16 and the rear seat path 18, respectively. The flow rates of a cold air or a hot air in the left path 14, the right path 16 and the rear seat path 18 are independently adjusted by independently controlling the left, right and rear seat temperature doors 20, 22 and 24.

The cold air or the hot air having an adjusted flow rate and flowing through the left path 14 is supplied to a left zone of a vehicle room. The cold air or the hot air having an adjusted flow rate and flowing through the right path 16 is supplied to a right zone of a vehicle room. The cold air or the hot air having an adjusted flow rate and flowing through the rear seat path 18 is supplied to a rear seat zone of a vehicle room. Thus, the left zone, the right zone and the rear seat zone of the vehicle room are independently cooled or heated.

In this regard, the left, right and rear seat temperature doors 20, 22 and 24 are rotated in response to a change in an indoor air temperature, an outdoor air temperature or a sunshine amount, whereby the opening positions thereof are automatically adjusted. Thus, the left, right and rear seat temperature doors 20, 22 and 24 automatically control the temperature of an air introduced into the vehicle room, in conformity with the indoor air temperature, the outdoor air temperature or the sunshine amount. Accordingly, regardless of the indoor air temperature, the outdoor air temperature or the sunshine amount, the temperature of an air introduced into the vehicle room is always controlled at a constant temperature in conformity with the temperature set by a user.

The three-zone-type air conditioning system further includes an air volume distribution door 30 installed at the upstream side of the left path 14 and the right path 16. The air volume distribution door 30 is configured to rotate between an entrance 14a of the left path 14 and an entrance 16a of the right path 16, thereby adjusting the opening degrees of the left path 14 and the right path 16. Thus, the air volume distribution door 30 adjusts the volumes of the air introduced from a main blower 40 into the left path 14 and the right path 16, thereby controlling the volumes of the cold air or the hot air supplied to the left zone and the right zone of the vehicle room.

The three-zone-type air conditioning system further includes a rear seat auxiliary blower 50 installed in the rear seat path 18. The rear seat auxiliary blower 50 is configured to further increase the volume and pressure of the cold air or the hot air flowing along the rear seat path 18, thereby further increasing the volume and pressure of the cold air or the hot air supplied to the rear seat zone. This helps enhance the ability to cool or heat the rear seat zone.

However, the conventional air conditioning system described above has the following two problems.

Firstly, if the opening positions of the left and right temperature doors 20 and 22 are changed in a state in which the opening degrees of the left and right paths 14 and 16 are controlled at a specific ratio by the air volume distribution door 30, the flow route of an air flowing toward a heater core 9 is changed and the static pressure difference between the left and right paths 14 and 16 is changed. This poses a problem in that the air volume distribution ratio in the left and right paths 14 and 16 is changed.

For example, if the opening degrees of the left and right paths 14 and 16 are controlled at a ratio of 3:7 by the air volume distribution door 30, a deviation is generated between the static pressures of the left and right paths 14 and 16 due to the difference in the opening degrees (cross-sectional areas) of the left and right paths 14 and 16.

In this state, if the opening position of each of the left and right temperature doors 20 and 22 is changed from a maximum cooling position X to a maximum heating position Y as illustrated in FIG. 2, the air existing in each of the left and right paths 14 and 16 passes through the heater core 19 as an air-resistant body. Thus, the static pressures at the upstream side of the left and right paths 14 and 16 grow larger. As a result, the static pressure difference between the left and right paths 14 and 16 is changed.

Particularly, the static pressures of the air vary depending on the cross-sectional areas of the paths. In the left and right paths 14 and 16 having different opening degrees (cross-sectional areas), the static pressure change rates with respect to the prior ones differ from each other due to the flow of the air through the heater core 19. The air volume distribution ratio of the air introduced from the main blower 40 into the left and right paths 14 and 16 is changed by the mutually-different static pressure change rates.

For example, due to the flow of the air through the heater core 19, the static pressure change rate in the left path 14 having a small opening degree (cross-sectional area) is smaller than the static pressure change rate in the right path 16 having a large opening degree (cross-sectional area). Since the static pressure change rate is small in the left path 14, the amount of the air introduced into the left path 14 becomes larger than before. As a result, the air volume distribution ratio of the air introduced from the main blower 40 into the left and right paths 14 and 16 is changed.

For that reason, the air volume distribution ratio of the air flowing toward the left and right paths 14 and 16 is not accurately controlled at an original control value. Consequently, the volumes of the cold air or the hot air supplied to the left and right zones of the vehicle room are not controlled at the user's desire. As a result, the comfort in the vehicle room decreases.

Secondly, if the rotation speed level of the rear seat auxiliary blower 50 is changed by manual control or automatic control, the amount of the air introduced into the rear seat path 18 is also changed. Due to the change in the amount of the air introduced into the rear seat path 18, the amounts of the air introduced into the left and right paths 14 and 16 are changed. Thus, the amounts of the cold air or the hot air blown toward the left and right zones of the vehicle room are changed. This poses a problem in that the ability to cool or heat the left and right zones of the vehicle room is reduced.

In particular, if the rotation speed level of the rear seat auxiliary blower 50 grows higher, the amount of the air introduced into the rear seat path 18 increases. Due to the increase of the amount of the air introduced into the rear seat path 18, the amount of the air introduced into the left and right paths 14 and 16 decreases. Thus, the amount of the cold air or the hot air blown toward the left and right zones of the vehicle room is reduced. This poses a problem in that the ability to cool or heat the left and right zones of the vehicle room is sharply reduced.

In the conventional air conditioning system, if the rotation speed level of the rear seat auxiliary blower 50 is changed, the static pressures acting in the left and right paths 14 and 16 are also changed. Due to the change in the static pressures in the left and right paths 14 and 16, the static pressure difference between the left and right paths 14 and 16 grows larger. As a result, the air volume distribution ratio in the left and right paths 14 and 16 is changed.

More specifically, the opening degrees (cross-sectional areas) of the left and right paths 14 and 16 are differently controlled by the air volume distribution door 30. Thus, a static pressure difference is generated between the left and right paths 14 and 16.

At this time, if the rotation speed level of the rear seat auxiliary blower 50 is changed, the static pressures acting in the left and right paths 14 and 16 are also changed. Due to this static pressure change, the static pressure difference between the left and right paths 14 and 16 is also changed.

In particular, the static pressure of an air varies depending on the cross-sectional area of a path. Therefore, in the left and right paths 14 and 16 having different opening degrees (cross-sectional areas), the static pressure change rates attributable to the change in the rotation speed level of the rear seat auxiliary blower 50 differ from each other. Due to the mutually-different static pressure change rates, the air volume distribution ratio of the air introduced from the main blower 40 into the left and right paths 14 and 16 is changed.

For example, due to the change in the rotation speed level of the rear seat auxiliary blower 50, the static pressure change rate in the left path 14 having a small opening degree (cross-sectional area) is smaller than the static pressure change rate in the right path 16 having a large opening degree (cross-sectional area). Since the static pressure change rate is small in the left path 14, the amount of the air introduced into the left path 14 becomes larger than before.

As a result, the air volume distribution ratio of the air introduced from the main blower 40 into the left and right paths 14 and 16 is changed.

For that reason, the air volume distribution ratio of the air flowing toward the left and right paths 14 and 16 is not accurately controlled at an original control value. Consequently, the volumes of the cold air or the hot air supplied to the left and right zones of the vehicle MOM are not controlled at the user's desire. As a result, the comfort in the vehicle room decreases.

SUMMARY OF THE INVENTION

In view of the above-noted problems, it is an object of the present invention to provide an air conditioning system for motor vehicles which is configured to actively control the opening position of the air volume distribution door when the opening position of the left temperature door or the right temperature door is changed and which is capable of actively coping with the change in the static pressure difference between the left and right paths attributable to the change in the opening position of the left temperature door or the right temperature door and actively coping with the resultant change in the air volume distribution ratio of the left and right paths.

Another object of the present invention is to provide an air conditioning system for motor vehicles which is configured to actively cope with the change in the air volume distribution ratio of the left and right paths attributable to the change in the opening position of the left temperature door or the right temperature door and which is capable of compensating the change in the air volume distribution ratio of the left and right paths attributable to the change in the opening position of the left temperature door or the right temperature door.

A further object of the present invention is to provide an air conditioning system for motor vehicles which is configured to compensate the change in the air volume distribution ratio of the left and right paths attributable to the change in the opening position of the left temperature door or the right temperature door and which is capable of controlling the air volume distribution ratio of the left and right paths at an original control value even when the opening position of the left temperature door or the right temperature door is changed.

A further object of the present invention is to provide an air conditioning system for motor vehicles which is configured to control the air volume distribution ratio of the left and right paths at an original control value even when the opening position of the left temperature door or the right temperature door is changed and which is capable of accurately controlling the volumes of a cold air or a hot air supplied to the left and right zones of the vehicle room, at a user's desire regardless of the change in the opening position of the left temperature door or the right temperature door and consequently capable of improving the comfort within the vehicle room.

A further object of the present invention is to provide an air conditioning system for motor vehicles which is configured to actively control the rotational speed of the main blower when the rotation speed level of the rear seat auxiliary blower is changed and which is capable of actively coping with the change in the air introduction amount of the left and right paths attributable to the change in the rotation speed level of the rear seat auxiliary blower.

A further object of the present invention is to provide an air conditioning system for motor vehicles which is configured to actively cope with the change in the air introduction amount of the left and right paths attributable to the change in the rotation speed level of the rear seat auxiliary blower and which is capable of compensating the change in the air introduction amount of the left and right paths attributable to the change in the rotation speed level of the rear seat auxiliary blower.

A further object of the present invention is to provide an air conditioning system for motor vehicles which is configured to compensate the change in the air introduction amount of the left and right paths attributable to the change in the rotation speed level of the rear seat auxiliary blower and which is capable of controlling the air introduction amount of the left and right paths at an original control value even when the rotation speed level of the rear seat auxiliary blower is changed.

A further object of the present invention is to provide an air conditioning system for motor vehicles which is configured to control the air introduction amount of the left and right paths at an original control value even when the rotation speed level of the rear seat auxiliary blower is changed and which is capable of controlling the volumes of a cold air or a hot air supplied to the left and right zones of the vehicle room, at original volumes regardless of the change in the rotation speed level of the rear seat auxiliary blower and consequently capable of improving the comfort within the vehicle room.

A further object of the present invention is to provide an air conditioning system for motor vehicles which is configured to actively control the opening position of the air volume distribution door when the rotation speed level of the rear seat auxiliary blower is changed and which is capable of actively coping with the change in the static pressure difference between the left and right paths attributable to the change in the rotation speed level of the rear seat auxiliary blower and actively coping with the resultant change in the air volume distribution ratio of the left and right paths.

A further object of the present invention is to provide an air conditioning system for motor vehicles which is configured to actively cope with the change in the air volume distribution ratio of the left and right paths attributable to the change in the rotation speed level of the rear seat auxiliary blower and which is capable of compensating the change in the air volume distribution ratio of the left and right paths attributable to the change in the rotation speed level of the rear seat auxiliary blower.

A further object of the present invention is to provide an air conditioning system for motor vehicles which is configured to compensate the change in the air volume distribution ratio of the left and right paths attributable to the change in the rotation speed level of the rear seat auxiliary blower and which is capable of controlling the air volume distribution ratio of the left and right paths at an original control value even when the rotation speed level of the rear seat auxiliary blower is changed.

A further object of the present invention is to provide an air conditioning system for motor vehicles which is configured to control the air volume distribution ratio of the left and right paths at an original control value even when the rotation speed level of the rear seat auxiliary blower is changed and which is capable of controlling the volumes of a cold air or a hot air supplied to the left and right zones of the vehicle room, at original volumes regardless of the change in the rotation speed level of the rear seat auxiliary blower and consequently capable of improving the comfort within the vehicle room.

In order to achieve the above objects, there is provided an air conditioning system for motor vehicles, including: an air conditioner case including a left path, a right path and a rear seat path; a temperature door configured to adjust a volume of a cold air or a hot air flowing through the left path, the right path and the rear seat path; a main blower configured to blow the cold air or the hot air toward the left path, the right path and the rear seat path; an air volume distribution door configured to control opening degrees of the left path and the right path and to distribute air volumes to the left path and the right path; a rear seat auxiliary blower configured to increase a volume and a pressure of the cold air or the hot air flowing through the rear seat path; and a control unit configured to, when an air volume distribution ratio of the main blower with respect to the left path and the right path is changed due to a change in one of an opening position of the temperature door and a rotation speed level of the rear seat auxiliary blower, correct an opening position of the air volume distribution door with respect to the left path and the right path and compensate a change in an air volume distribution ratio of the left path and the right path attributable to a change in the opening position of the temperature door and the rotation speed level of the rear seat auxiliary blower.

The air conditioning system may further include: a first memory part configured to store air volume distribution door compensating values associated with temperature door opening position change angles, wherein the control unit may be configured to, when the opening position of the temperature door is changed, detect an air volume distribution door compensating value corresponding to a temperature door opening position change angle of the temperature door from the first memory part and correct the opening position of the air volume distribution door with respect to the left path and the right path based on the detected air volume distribution door compensating value.

In the air conditioning system, the temperature door may include a left temperature door configured to adjust an amount of the cold air or the hot air flowing through the left path and a right temperature door configured to adjust an amount of the cold air or the hot air flowing through the right path, and the control unit may be configured to, when the opening positions of the left temperature door and the right temperature door are changed, detect an air volume distribution door compensating value corresponding to temperature door opening position change angles of the left temperature door and the right temperature door from the first memory part and correct the opening position of the air volume distribution door based on the detected air volume distribution door compensating value.

In the air conditioning system, the control unit may include a calculating part configured to, when the opening positions of the left temperature door and the right temperature door are changed, calculate temperature door opening position change angles by arithmetically processing post-change opening positions of the left temperature door and the right temperature door and pre-change opening positions of the left temperature door and the right temperature door, and the control unit may be configured to detect an air volume distribution door compensating value corresponding to the temperature door opening position change angles calculated in the calculating part from the first memory part and correct the opening position of the air volume distribution door based on the detected air volume distribution door compensating value.

The air conditioning system may further include: a second memory part configured to store air volume distribution door compensating values associated with main blower/auxiliary blower rotation speed level deviations, wherein the control unit may be configured to, when the rotation speed level of the rear seat auxiliary blower is changed, detect an air volume distribution door compensating value corresponding to a main blower/auxiliary blower rotation speed level deviation from the second memory part and correct the opening position of the air volume distribution door with respect to the left path and the right path based on the detected air volume distribution door compensating value.

In the air conditioning system, the control unit may be configured to, when the rotation speed level of the rear seat auxiliary blower is changed, correct a rotational speed of the main blower and compensate a change in an air introduction amount of the left path and the right path attributable to the change in the rotation speed level of the rear seat auxiliary blower.

The air conditioning system may further include: a third memory part configured to store main blower compensating values associated with main blower/auxiliary blower rotation speed level deviations, wherein the control unit may be configured to, when the rotation speed level of the rear seat auxiliary blower is changed, detect a main blower compensating value corresponding to a main blower/auxiliary blower rotation speed level deviation from the third memory part and correct a rotational speed of the main blower based on the detected main blower compensating value.

According to the present invention, the air conditioning system for motor vehicles is configured to actively control the opening position of the air volume distribution door when the opening position of the left temperature door or the right temperature door is changed. Therefore, there is provided an effect that the air conditioning system is capable of actively coping with the change in the static pressure difference between the left and right paths attributable to the change in the opening position of the left temperature door or the right temperature door and actively coping with the resultant change in the air volume distribution ratio of the left and right paths.

Since the air conditioning system is configured to actively cope with the change in the air volume distribution ratio of left and right paths attributable to the change in the opening position of the left temperature door or the right temperature door, there is provided an effect that the air conditioning system is capable of compensating the change in the air volume distribution ratio of the left and right paths attributable to the change in the opening position of the left temperature door or the right temperature door.

Since the air conditioning system is configured to compensate the change in the air volume distribution ratio of the left and right paths attributable to the change in the opening position of the left temperature door or the right temperature door, there is provided an effect that the air conditioning system is capable of maintaining the air volume distribution ratio of the left and right paths at an original control value even when the opening position of the left temperature door or the right temperature door is changed.

Since the air conditioning system is configured to maintain the air volume distribution ratio of the left and right paths at an original control value even when the opening position of the left temperature door or the right temperature door is changed, there is provided an effect that the air conditioning system is capable of accurately controlling the volumes of a cold air or a hot air supplied to the left and right zones of the vehicle room, at a user's desire regardless of the change in the opening position of the left temperature door or the right temperature door and consequently capable of improving the comfort within the vehicle room.

Since the air conditioning system is configured to actively compensate the rotational speed of the main blower when the rotation speed level of the rear seat auxiliary blower is changed, there is provided an effect that the air conditioning system is capable of actively coping with the change in the air introduction amount of the left and right paths attributable to the change in the rotation speed level of the rear seat auxiliary blower.

Since the air conditioning system is configured to actively cope with the change in the air introduction amount of the left and right paths attributable to the change in the rotation speed level of the rear seat auxiliary blower, there is provided an effect that the air conditioning system is capable of compensating the change in the air introduction amount of the left and right paths attributable to the change in the rotation speed level of the rear seat auxiliary blower.

Since the air conditioning system is configured to compensate the change in the air introduction amount of the left and right paths attributable to the change in the rotation speed level of the rear seat auxiliary blower, there is provided an effect that the air conditioning system is capable of controlling the air introduction amount of the left and right paths at an original control value even when the rotation speed level of the rear seat auxiliary blower is changed.

Since the air conditioning system is configured to control the air introduction amount of the left and right paths at an original control value even when the rotation speed level of the rear seat auxiliary blower is changed, there is provided an effect that the air conditioning system is capable of controlling the volumes of a cold air or a hot air supplied to the left and right zones of a vehicle room and the volume ratio of a cold air or a hot air, at original control values regardless of the change in the rotation speed level of the rear seat auxiliary blower and consequently capable of improving the comfort within the vehicle room.

Since the air conditioning system is configured to actively compensate the opening position of the air volume distribution door when the rotation speed level of the rear seat auxiliary blower is changed, there is provided an effect that the air conditioning system is capable of actively coping with the change in the static pressure difference between the left and right paths attributable to the change in the rotation speed level of the rear seat auxiliary blower and actively coping with the resultant change in the air volume distribution ratio of the left and right paths.

Since the air conditioning system is configured to actively cope with the change in the air volume distribution ratio of the left and right paths attributable to the change in the rotation speed level of the rear seat auxiliary blower, there is provided an effect that the air conditioning system is capable of compensating the change in the air volume distribution ratio of the left and right paths attributable to the change in the rotation speed level of the rear seat auxiliary blower.

Since the air conditioning system is configured to compensate the change in the air volume distribution ratio of the left and right paths attributable to the change in the rotation speed level of the rear seat auxiliary blower, there is provided an effect that the air conditioning system is capable of maintaining the air volume distribution ratio of the left and right paths at an original control value even when the rotation speed level of the rear seat auxiliary blower is changed.

Since the air conditioning system is configured to maintain the air volume distribution ratio of the left and right paths at an original control value even when the rotation speed level of the rear seat auxiliary blower is changed, there is provided an effect that the air conditioning system is capable of accurately controlling the volumes of a cold air or a hot air supplied to the left and right zones of the vehicle room and the volume ratio of a cold air or a hot air, at original control values regardless of the change in the rotation speed level of the rear seat auxiliary blower and consequently capable of improving the comfort within the vehicle room.

BRIEF DESCRIPTION OF THE DRAWINGS

The above and other objects and features of the present invention will become apparent from the following description of preferred embodiments given in conjunction with the accompanying drawings.

DETAILED DESCRIPTION OF EXEMPLARY EMBODIMENTS OF THE INVENTION

A preferred embodiment of an air conditioning system for motor vehicles according to the present invention will now be described in detail with reference to the accompanying drawings. Components similar to those of the prior art described earlier will be designated by like reference symbols. The description and drawings serve to enable one skilled in the art to make and use the invention, and are not intended to limit the scope of the invention in any manner.

Figure 3:
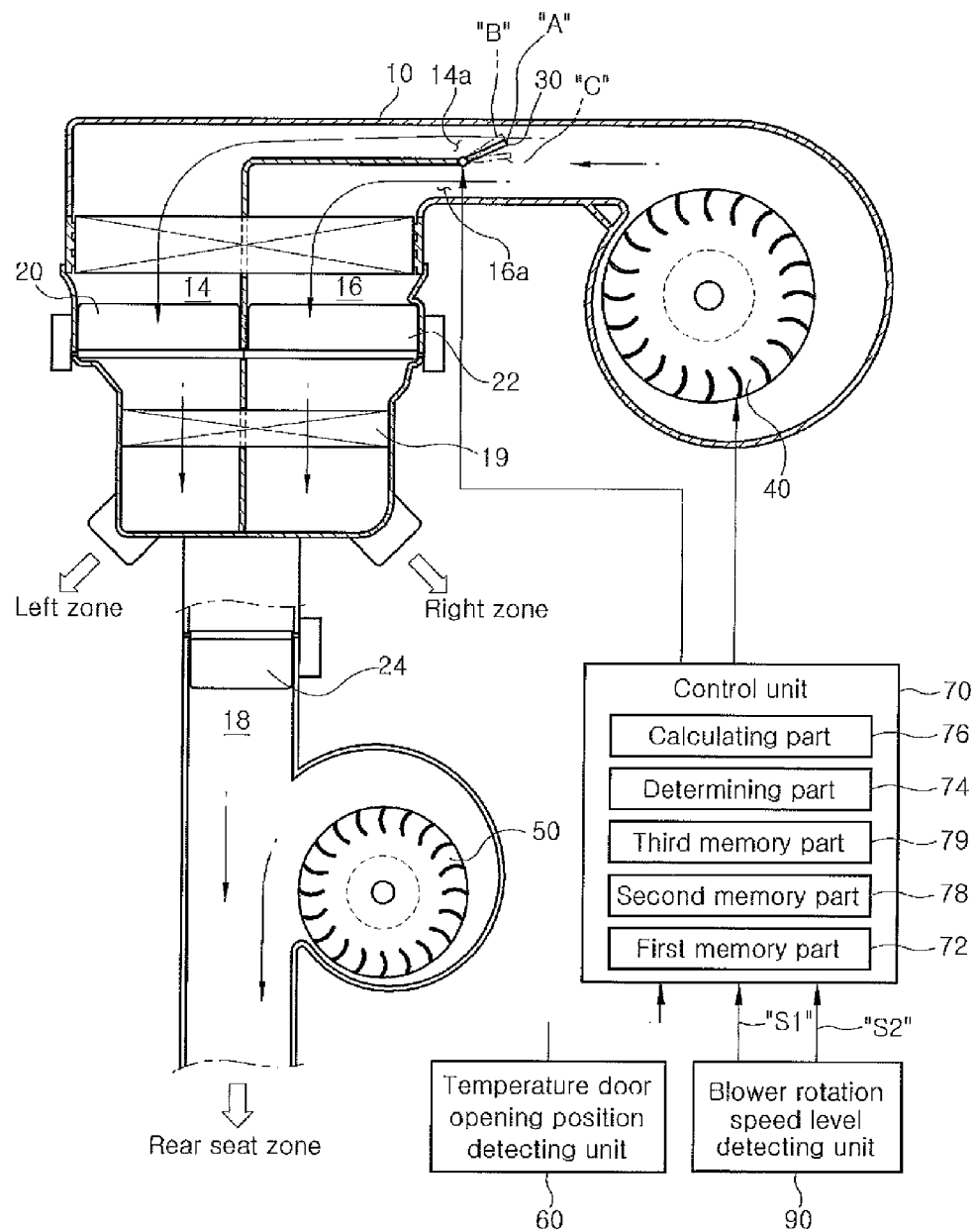
FIG. 3 is a horizontal sectional view illustrating the configuration of an air conditioning system for motor vehicles according to an embodiment of the present disclosure.

Prior to describing features of an air conditioning system for motor vehicles according to the present invention, a three-zone-type air conditioning system will be briefly described with reference to FIG. 3.

In the three-zone-type air conditioning system, a left path 14, a right path 16 and a rear seat path 18 are formed within an air conditioner case 10. Left, right and rear seat temperature doors 20, 22 and 24 are installed in the left path 14, the right path 16 and the rear seat path 18, respectively. The flow rates of a cold air or a hot air in the left path 14, the right path 16 and the rear seat path 18 are independently adjusted by independently controlling the left, right and rear seat temperature doors 20, 22 and 24.

The three-zone-type air conditioning system further includes an air volume distribution door 30 installed at the upstream side of the left path 14 and the right path 16. The air volume distribution door 30 is configured to rotate between an entrance 14a of the left path 14 and an entrance 16a of the right path 16, thereby adjusting the opening degrees of the left path 14 and the right path 16. Thus, the air volume distribution door 30 adjusts the volumes of the air introduced from a main blower 40 into the left path 14 and the right path 16, thereby controlling the volumes of the cold air or the hot air supplied to the left zone and the right zone of the vehicle room.

The three-zone-type air conditioning system further includes a rear seat auxiliary blower 50 installed in the rear seat path 18. The rear seat auxiliary blower 50 is configured to further increase the volume and pressure of the cold air or the hot air flowing along the rear seat path 18, thereby further increasing the volume and pressure of the cold air or the hot air supplied to the rear seat zone.

Next, some features of the air conditioning system for motor vehicles according to the present invention will be described in detail with reference to FIG. 3.

The air conditioning system according to the present invention includes a temperature door opening position detecting unit 60 configured to detect the opening positions of the left and right temperature doors 20 and 22. The temperature door opening position detecting unit 60 is formed of door sensors (not illustrated) installed in the left and right temperature doors 20 and 22. The temperature door opening position detecting unit 60 detects the opening positions of the left and right temperature doors 20 and 22 and inputs the detected opening positions of the left and right temperature doors 20 and 22 to a below-described control unit 70 in real time.

The left and right temperature doors 20 and 22 may be independently controlled by users who take front left and right seats of a motor vehicle. Only the initial opening positions of the left and right temperature doors 20 and 22 are independently controlled pursuant to the user setting temperatures. Subsequently, the opening positions of the left and right temperature doors 20 and 22 are collectively controlled depending on the indoor air temperature, the outdoor air temperature or the sunshine amount.

Referring again to FIG. 3, the air conditioning system according to the present invention further includes the control unit 70. The control unit 70 is formed of a microprocessor and includes a first memory part 72, a determining part 74 and a calculating part 76.

The first memory part 72 stores air volume distribution door compensating values associated with temperature door opening position change angles. The air volume distribution door compensating values are air volume distribution door control values for compensating an air volume distribution ratio change in the left and right paths 14 and 16 attributable to a change in the opening positions of the left and right temperature doors 20 and 22 when the opening positions of the left and right temperature doors 20 and 22 are changed. The air volume distribution door compensating values are differently set depending on the temperature door opening position change angles.

Figure 1:
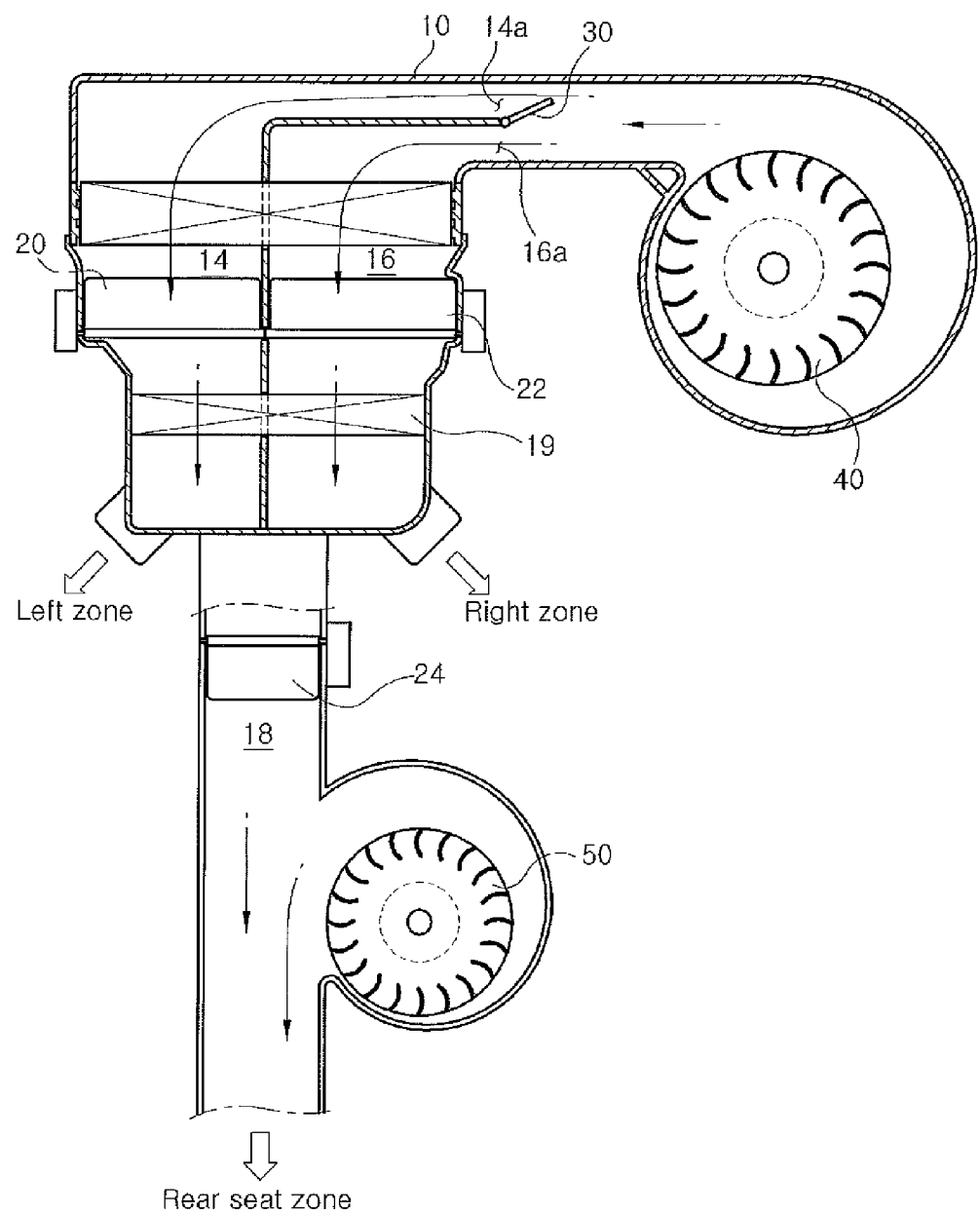
FIG. 1 is a horizontal sectional view illustrating the configuration of a conventional air conditioning system for motor vehicles according to prior art.
Figure 2:
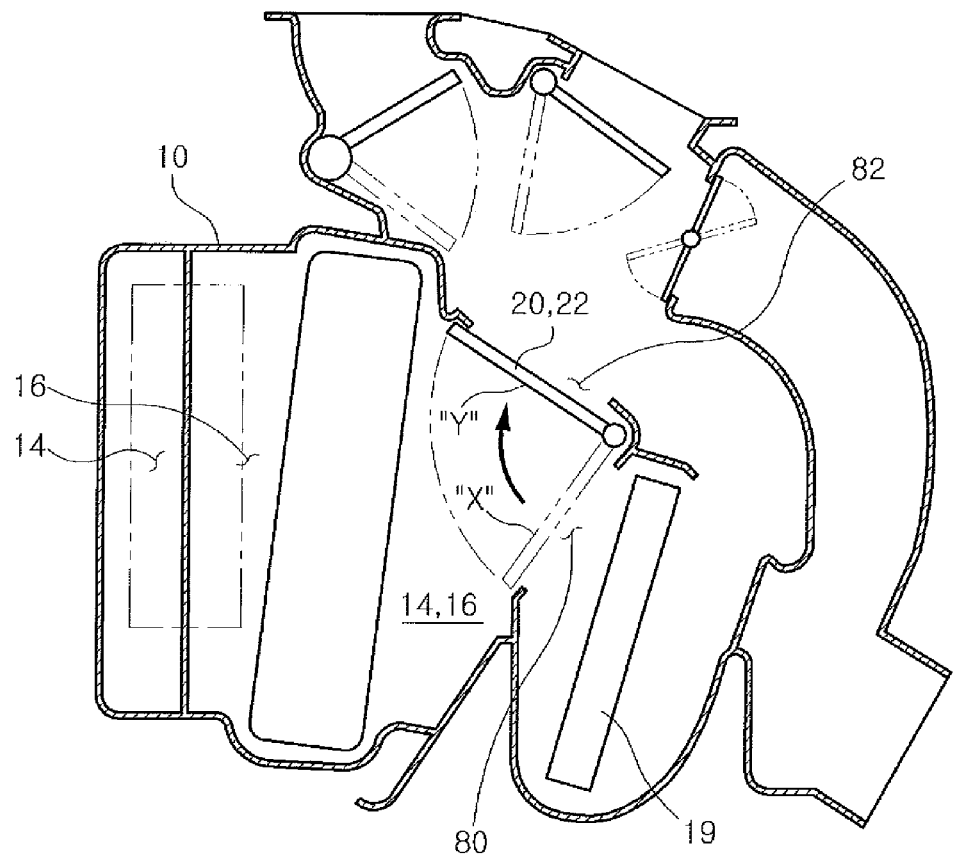
FIG. 2 is a vertical sectional view illustrating the configuration of a conventional air conditioning system for motor vehicles according to prior art.

The air volume distribution door compensating values are divided into values corresponding to the temperature door opening position change angles in the opening direction of a hot air path 80 (see FIG. 2) and values corresponding to the temperature door opening position change angles in the opening direction of a cold air path 82 (see FIG. 2).

When the opening positions of the left and right temperature doors 20 and 22 are inputted from the temperature door opening position detecting unit 60 in a real time, the determining part 74 determines whether the opening positions of the left and right temperature doors 20 and 22 are changed.

The calculating part 76 is one kind of calculation programs. If it is determined by the determining part 74 that the opening positions of the left and right temperature doors 20 and 22 are changed, the calculating part 76 calculates the temperature door opening position change angles by arithmetically processing the post-change opening positions of the left and right temperature doors 20 and 22 and the pre-change opening positions of the left and right temperature doors 20 and 22.

If the temperature door opening position change angles are calculated in the calculating part 76, the control unit 70 detects the air volume distribution door compensating value corresponding to the temperature door opening position change angles from the first memory part 72.

If the detection of the air volume distribution door compensating value is completed, the opening position of the air volume distribution door 30 is corrected based on the air volume distribution door compensating value. For example, the opening position of the air volume distribution door 30 is corrected from a position A to a position B.

This makes it possible to actively cope with a change in a static pressure difference between the left and right paths 14 and 16 attributable to the change of the opening positions of the left and right temperature doors 20 and 22 and to actively cope with a resultant change in an air volume distribution ratio of the left and right paths 14 and 16.

Accordingly, it is possible to compensate the change in the static pressure difference between the left and right paths 14 and 16 attributable to the change of the opening positions of the left and right temperature doors 20 and 22. As a result, it is possible to accurately maintain the air volume distribution ratio of the left and right paths 14 and 16 at an original value even when the opening positions of the left and right temperature doors 20 and 22 are changed.

Thus, it is possible to accurately control the volume ratio of a cold air or a hot air supplied to the left and right zones of the vehicle room, at the user's desire regardless of the change in the opening positions of the left and right temperature doors 20 and 22. This makes it possible to improve the comfort within the vehicle room.

The air volume distribution door compensating values associated with the temperature door opening position change angles, which are stored in the first memory part 72, are divided into air volume distribution door compensating values set under a condition in which the opening positions of the left and right temperature doors 20 and 22 are changed in an opening direction of the hot air path 80 and air volume distribution door compensating values set under a condition in which the opening positions of the left and right temperature doors 20 and 22 are changed in an opening direction of the cold air path 82 (see FIG. 2).

Under the condition in which the opening positions of the left and right temperature doors 20 and 22 are changed in an opening direction of the hot air path 80, the air volume distribution door compensating values may be set so as to move the air volume distribution door 30 toward one of the left and right paths 14 and 16 whichever is smaller in an opening degree. Particularly, the air volume distribution door compensating values may be set so that, as the temperature door opening position change angles of the left and right temperature doors 20 and 22 with respect to the hot air path 80 grow larger, the air volume distribution door 30 is gradually moved toward one of the left and right paths 14 and 16 whichever is smaller in an opening degree.

The air volume distribution door compensating values may be set so that, as the temperature door opening position change angles of the left and right temperature doors 20 and 22 with respect to the hot air path 80 grow larger, the opening degree of one of the left and right paths 14 and 16 whichever is smaller in an opening degree is gradually reduced.

The reason for setting the air volume distribution door compensating values in this way is as follows. When the opening positions of the left and right temperature doors 20 and 22 are changed in the opening direction of the hot air path 80, the static pressure change rate of one of the left and right paths 14 and 16 whichever is smaller in an opening degree is lower than the static pressure change rate of one of the left and right paths 14 and 16 whichever is larger in an opening degree. Thus, a larger amount of air volume is distributed to one of the left and right paths 14 and 16 whichever is lower in a static pressure change rate (smaller in an opening degree).

Accordingly, if the opening degree of the path having a smaller opening degree is further reduced by moving the air volume distribution door 30 toward the path having a smaller opening degree, it is possible to avoid excessive distribution of an air volume to the path having a smaller opening degree.

On the other hand, under the condition in which the opening positions of the left and right temperature doors 20 and 22 are changed in an opening direction of the cold air path 82, the air volume distribution door compensating values may be set so as to move the air volume distribution door 30 toward one of the left and right paths 14 and 16 whichever is larger in an opening degree. Particularly, the air volume distribution door compensating values may be set so that, as the temperature door opening position change angles of the left and right temperature doors 20 and 22 with respect to the cold air path 82 grow larger, the air volume distribution door 30 is gradually moved toward one of the left and right paths 14 and 16 whichever is larger in an opening degree.

The air volume distribution door compensating values may be set so that, as the temperature door opening position change angles of the left and right temperature doors 20 and 22 with respect to the cold air path 82 grow larger, the opening degree of one of the left and right paths 14 and 16 whichever is larger in an opening degree is gradually reduced.

The reason for setting the air volume distribution door compensating values in this way is as follows. When the opening positions of the left and right temperature doors 20 and 22 are changed in the opening direction of the cold air path 82, the static pressure change rate of one of the left and right paths 14 and 16 whichever is smaller in an opening degree is lower than the static pressure change rate of one of the left and right paths 14 and 16 whichever is larger in an opening degree. Thus, the air volume distribution to one of the left and right paths 14 and 16 whichever is lower in a static pressure change rate (smaller in an opening degree) is rapidly reduced.

Accordingly, if the opening degree of the path having a smaller opening degree is further increased by moving the air volume distribution door 30 toward the path having a larger opening degree, it is possible to avoid insufficient distribution of an air volume to the path having a smaller opening degree.

Referring again to FIG. 3, the air conditioning system according to the present invention further includes a blower rotation speed level detecting unit 90 configured to detect rotation speed levels of the main blower 40 and the rear seat auxiliary blower 50.

The blower rotation speed level detecting unit 90 is formed of rotation speed detecting sensors (not illustrated) respectively installed in the main blower 40 and the rear seat auxiliary blower 50. The blower rotation speed level detecting unit 90 detects the rotation speed levels of the main blower 40 and the rear seat auxiliary blower 50 and then inputs a main blower rotation speed level signal S1 and an auxiliary blower rotation speed level signal S2 to the control unit 70 which will be described below.

The control unit 70 further includes a second memory part 78 and a third memory part 79. The second memory part 78 stores air volume distribution door compensating values associated with main blower/auxiliary blower rotation speed level deviations.

The air volume distribution door compensating values associated with the main blower/auxiliary blower rotation speed level deviations are air volume distribution door control values for correcting a change in an air volume distribution ratio of the left and right paths 14 and 16 attributable to an increase in the rotation speed level of the rear seat auxiliary blower 50 when the rotation speed level of the rear seat auxiliary blower 50 is changed, for example, when the rotation speed level of the rear seat auxiliary blower 50 is increased. The air volume distribution door compensating values are differently stored depending on the main blower/auxiliary blower rotation speed level deviations.

The third memory part 79 stores main blower compensating values associated with the main blower/auxiliary blower rotation speed level deviations.

The main blower compensating values associated with the main blower/auxiliary blower rotation speed level deviations are main blower control values for correcting a change in an air introduction amount of the left and right paths 14 and 16 attributable to an increase in the rotation speed level of the rear seat auxiliary blower 50 when the rotation speed level of the rear seat auxiliary blower 50 is changed, for example, when the rotation speed level of the rear seat auxiliary blower 50 is increased. The main blower compensating values are differently stored depending on the main blower/auxiliary blower rotation speed level deviations.

If the rotation speed level of the rear seat auxiliary blower 50 is inputted from the blower rotation speed level detecting unit 90 in a real time, the determining part 74 of the control unit 70 determines whether the rotation speed level of the rear seat auxiliary blower 50 is changed. In this case, the determining part 74 may determine whether the rotation speed level of the rear seat auxiliary blower 50 is changed in an increasing direction.

If it is determined by the determining part 74 that the rotation speed level of the rear seat auxiliary blower 50 is changed, the calculating part 76 of the control unit 70 calculates a main blower/auxiliary blower rotation speed level deviation by arithmetically processing the changed rotation speed level of the rear seat auxiliary blower 50 and the rotation speed level of the main blower 40.

If the main blower/auxiliary blower rotation speed level deviation is calculated in the calculating part 76, the control unit 70 detects the air volume distribution door compensating value and the main blower compensating value corresponding to the calculated main blower/auxiliary blower rotation speed level deviation from the second memory part 78 and the third memory part 79.

If the detection of the air volume distribution door compensating value and the main blower compensating value is completed, the rotation speed level of the main blower 40 is corrected based on the detected main blower compensating value, and the opening position of the air volume distribution door 30 is corrected based on the detected air volume distribution door compensating value.

For example, the rotation speed level of the main blower 40 is increased and the opening position of the air volume distribution door 30 is corrected from a position A to a position C.

Accordingly, it is possible to actively cope with the change in the air introduction amount of the left and right paths 14 and 16 attributable to the increase in the rotation speed level of the rear seat auxiliary blower 50, the resultant change in the amount of a cold air or a hot air supplied to the left and right zones of the vehicle room, the change in the static pressure difference between the left and right paths 14 and 16 attributable to the increase in the rotation speed level of the rear seat auxiliary blower 50, and the resultant change in the air volume distribution ratio of the left and right paths 14 and 16. This makes it possible to compensate the change in the air introduction amount of the left and right paths 14 and 16 attributable to the increase in the rotation speed level of the rear seat auxiliary blower 50 and the change in the air volume distribution ratio of the left and right paths 14 and 16.

As a result, the air introduction amount of the left and right paths 14 and 16 and the air volume distribution ratio of the left and right paths 14 and 16 are kept at the original values even when the rotation speed level of the rear seat auxiliary blower 50 is increased.

Consequently, it is possible to accurately control the volumes of a cold air or a hot air supplied to the left and right zones of the vehicle room and the volume ratio of a cold air or a hot air supplied to the left and right zones of the vehicle room, at the original values, regardless of the increase in the rotation speed level of the rear seat auxiliary blower 50. This makes it possible to improve the comfort within the vehicle room.

The air volume distribution door compensating values associated with the main blower/auxiliary blower rotation speed level deviations, which are stored in the second memory part 78, may be set so that, as the main blower/auxiliary blower rotation speed level deviations grow larger, the air volume distribution door 30 is gradually moved to one of the left and right paths 14 and 16 whichever is larger in an opening degree.

Specifically, the air volume distribution door compensating values associated with the main blower/auxiliary blower rotation speed level deviations may be set so that, as the main blower/auxiliary blower rotation speed level deviations grow larger, the opening degree of one of the left and right paths 14 and 16 having a smaller opening degree is gradually increased and the opening degree of one of the left and right paths 14 and 16 having a larger opening degree is gradually reduced.

The reason for setting the air volume distribution door compensating values in this way is as follows. For example, if the rotation speed level of the rear seat auxiliary blower 50 increases and if the rotation speed level deviation between the main blower 40 and the rear seat auxiliary blower 50 grows larger, the air volume distribution is further reduced in one of the left and right paths 14 and 16 having a smaller opening degree and the air volume distribution is further increased in one of the left and right paths 14 and 16 having a larger opening degree. This is because the left and right paths 14 and 16 have different static pressure change rates.

For that reason, if the rotation speed level of the rear seat auxiliary blower 50 increases and if the rotation speed level deviation between the main blower 40 and the rear seat auxiliary blower 50 grows larger, the opening degree of one of the left and right paths 14 and 16 having a smaller opening degree is gradually increased and the opening degree of one of the left and right paths 14 and 16 having a larger opening degree is gradually reduced. By doing so, the air volume distribution is increased in one of the left and right paths 14 and 16 having a smaller opening degree and the air volume distribution is reduced in one of the left and right paths 14 and 16 having a larger opening degree.

As a result, it is possible to avoid insufficient air volume distribution to one of the left and right paths 14 and 16 having a smaller opening degree and excessive air volume distribution to one of the left and right paths 14 and 16 having a larger opening degree.

The main blower compensating values associated with the main blower/auxiliary blower rotation speed level deviations, which are stored in the third memory part 79, may be set so that, as the main blower/auxiliary blower rotation speed level deviations grow larger, the rotation speed level of the main blower 40 is gradually increased in proportion thereto.

The reason is as follows. For example, if the rotation speed level of the rear seat auxiliary blower 50 increases and if the rotation speed level deviation between the main blower 40 and the rear seat auxiliary blower 50 grows larger, the air introduction amounts in the left and right paths 14 and 16 are gradually reduced. For that reason, the rotation speed level of the main blower 40 is increased as the rotation speed level of the rear seat auxiliary blower 50 increases and as the rotation speed level deviation between the main blower 40 and the rear seat auxiliary blower 50 grows larger. By doing so, it is possible to increase the amount of the air introduced into the left and right paths 14 and 16 and to cope with the reduction in the amount of the air introduced into the left and right paths 14 and 16. As a result, it is possible to avoid the reduction in the amount of the air introduced into the left and right paths 14 and 16, which becomes worse as the rotation speed level of the rear seat auxiliary blower 50 increases.

Figure 4:
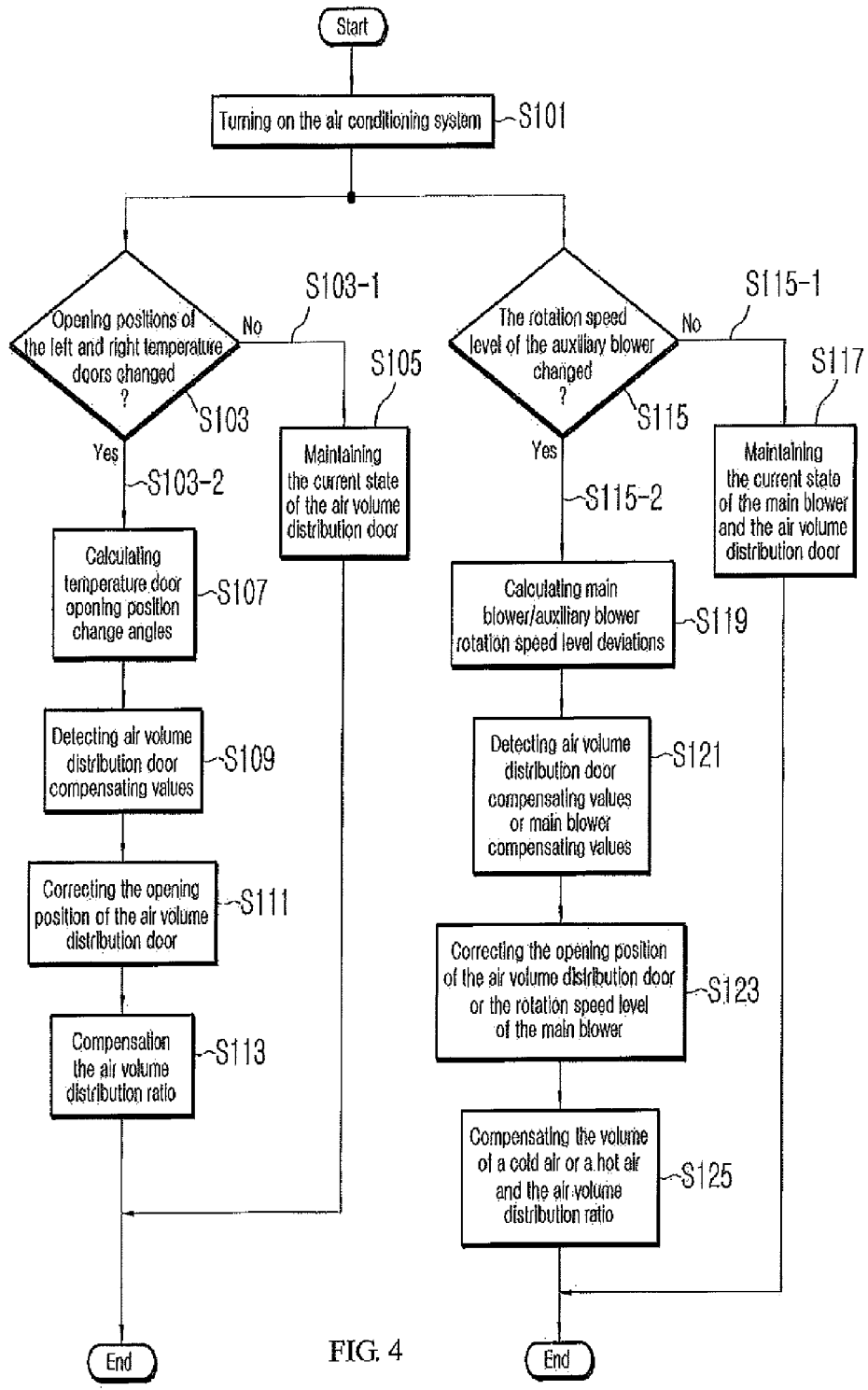
FIG. 4 is a flowchart illustrating an operation of the air conditioning system for motor vehicles according to an embodiment of the present disclosure.

Next, an operation example of the air conditioning system configured as above will be described with reference to FIGS. 3 and 4.

Firstly, the air conditioning system is turned on (S101). In this state, determination is made as to whether the opening positions of the left and right temperature doors 20 and 22 are changed (S103).

If it is determined that the opening positions of the left and right temperature doors 20 and 22 are not changed (S103-1), the control unit 70 keeps the opening position of the air volume distribution door 30 in the current positions (S105).

Conversely, if it is determined that the opening positions of the left and right temperature doors 20 and 22 are changed (S103-2), the control unit 70 determines that the air volume distribution ratio of the left and right paths 14 and 16 is changed pursuant to the change in the opening positions of the left and right temperature doors 20 and 22.

Upon making this determination, the control unit 70 calculates the temperature door opening position change angles by arithmetically processing the post-change opening positions of the left and right temperature doors 20 and 22 and the pre-change opening positions of the left and right temperature doors 20 and 22 (S107).

If the calculation of the temperature door opening position change angles is completed, the control unit 70 detects the air volume distribution door compensating value corresponding to the temperature door opening position change angles from the first memory part 72 (S109).

If the detection of the air volume distribution door compensating value is completed, the control unit 70 corrects the opening position of the air volume distribution door 30 based on the air volume distribution door compensating value (S111). For example, the control unit 70 corrects the opening position of the air volume distribution door 30 from a position A to a position B.

Thus, the control unit 70 compensates the change in the air volume distribution ratio of the left and right paths 14 and 16 attributable to the change in the opening positions of the left and right temperature doors 20 and 22 (S113).

This makes it possible to maintain the air volume distribution ratio of the left and right paths 14 and 16 at an original value even when the opening positions of the left and right temperature doors 20 and 22 are changed. As a result, it is possible to accurately control the volume ratio of a cold air or a hot air supplied to the left and right zones of the vehicle room, at the user's desire regardless of the change in the opening positions of the left and right temperature doors 20 and 22. This makes it possible to improve the comfort within the vehicle room.

When the air conditioning system is turned on (S101), the control unit 70 also determines whether the rotation speed level of the rear seat auxiliary blower 50 is changed (S115). For example, the control unit 70 determines whether the rotation speed level of the rear seat auxiliary blower 50 is increased.

If it is determined that the rotation speed level of the rear seat auxiliary blower 50 is not increased (S115-1), the control unit 70 maintains the opening position of the air volume distribution door 30 and the rotation speed level of the main blower 40 (S117).

Conversely, if it is determined that the rotation speed level of the rear seat auxiliary blower 50 is increased (S115-2), the control unit 70 determines that the volumes of a cold air or a hot air and the air volume distribution ratio in the left and right paths 14 and 16 are changed pursuant to the increase in the rotation speed level of the rear seat auxiliary blower 50.

Upon making this determination, the control unit 70 calculates a main blower/auxiliary blower rotation speed level deviation by arithmetically processing the increased rotation speed level of the rear seat auxiliary blower 50 and the rotation speed level of the main blower 40 (S119).

If the calculation of the main blower/auxiliary blower rotation speed level deviation is completed, the control unit 70 detects the air volume distribution door compensating value and the main blower compensating value corresponding to the calculated main blower/auxiliary blower rotation speed level deviation from the second memory part 78 and the third memory part 79 (S121).

If the detection of the air volume distribution door compensating value and the main blower compensating value is completed, the control unit 70 corrects the opening position of the air volume distribution door 30 and the rotation speed level of main blower 40 based on the detected air volume distribution door compensating value and the detected main blower compensating value (S123). For example, the control unit 70 corrects the opening position of the air volume distribution door 30 from a position A to a position C and increases the rotation speed level of the main blower 40.

Thus, the control unit 70 compensates the change in the volume of a cold air or a hot air and the change in the air volume distribution ratio of the left and right paths 14 and 16 attributable to the increase in the rotation speed level of the rear seat auxiliary blower 50 (S125).

Consequently, it is possible to keep constant the volume of a cold air or a hot air and the air volume distribution ratio of the left and right paths 14 and 16 even when the rotation speed level of the rear seat auxiliary blower 50 is increased.

As a result, it is possible to accurately control the volume and the volume distribution ratio of a cold air or a hot air supplied to the left and right zones of the vehicle room, at the original control value regardless of the increase in the rotation speed level of the rear seat auxiliary blower 50. This makes it possible to improve the comfort within the vehicle room.

While a preferred embodiment of the present invention have been described above, the present invention is not limited to this embodiment. It is to be understood that various changes and modifications may be made without departing from the scope of the invention defined in the claims.

For example, in the aforementioned embodiment, the left and right temperature doors 20 and 22 are separately installed in the left and right paths 14 and 16. However, if necessary, a one-piece-type temperature door may be installed in the left and right paths 14 and 16. In this case, the air conditioning system is configured to actively correct the opening position of the air volume distribution door 30 when the opening position of the one-piece-type temperature door is changed.

Furthermore, in the aforementioned embodiment, the air volume distribution door compensating values and the main blower compensating values associated with the main blower/auxiliary blower rotation speed level deviations are previously stored in the first memory part 72 and the second memory part 78 and are used to correct the opening position of the air volume distribution door 30 and the rotation speed level of the main blower 40. However, the present invention is not limited thereto. The air volume distribution door compensating values and the main blower compensating values associated with the main blower/auxiliary blower rotation speed level deviations may be calculated using a predetermined arithmetic processing program. In this case, the control unit 70 may store an arithmetic processing program for calculating the air volume distribution door compensating values and the main blower compensating values associated with the main blower/auxiliary blower rotation speed level deviations.

What is claimed is:

1. An air conditioning system for a motor vehicle comprising:
    an air conditioner case including a left path, a right path and a rear seat path formed therein;
    a temperature door adjusting a volume of air flowing through each of the left path, the right path, and the rear seat path;
    a main blower in fluid communication with the air conditioner case and blowing the air through the left path, the right path, and the rear seat path;
    an air volume distribution door disposed in the air conditioning case and angularly adjustable with respect to a flow direction of the air, the air volume distribution door varying an opening of the left path and an opening of the right path, and selectively dividing a volume of the air to the left path and the right path;
    an auxiliary blower in fluid communication with the rear seat path increasing a volume and a pressure of the air flowing through the rear seat path; and
    a control unit in signal communication with the main blower, the auxiliary blower, and the air volume distribution door, the control unit detecting a change of one of an opening position of the temperature door and a rotational speed of the auxiliary blower, the control unit controlling an angular position of the air volume distribution door with respect to the left path and the right path, wherein the control unit includes a first memory part storing a plurality of first air volume distribution door compensating values, each of the plurality of first air volume distribution door compensating values associated with a corresponding one of a plurality of temperature door opening position change angles, and wherein the control unit includes a second memory part storing a plurality of second air volume distribution door compensating values, each of the plurality of second air volume distribution door compensating values associated with a corresponding one of a plurality of main blower/auxiliary blower rotation speed level deviations.

2. The air conditioning system of claim 1, wherein the control unit selects one of the plurality of first air volume distribution door compensating values associated with one of the plurality of temperature door opening position change angles equal to an angle formed by the change in the opening position of the temperature door from the first memory part, and wherein the control unit controls the angular position of the air volume distribution door depending on the selected one of the plurality of first air volume distribution door compensating values.

3. The air conditioning system of claim 1, wherein the temperature door includes a left temperature door adjusting a volume of the air flowing through the left path and a right temperature door adjusting a volume of the air flowing through the right path.

4. The air conditioning system of claim 3, wherein the control unit selects one of the plurality of first air volume distribution door compensating values associated with one of the plurality of temperature door opening position change angles equal to an angle formed by a change in an opening position of the left temperature door from the first memory part and one of the plurality of first air volume distribution door compensating values associated with one of the plurality of temperature door opening position change angles equal to an angle formed by a change in an opening position of the right temperature door from the first memory part.

5. The air conditioning system of claim 4, wherein the control unit controls the angular position of the air volume distribution door depending on the selected one of the plurality of first air volume distribution door compensating values associated with the one of the plurality of temperature door opening position change angles equal to the angle formed by the change in the opening position of the left temperature door and the selected one of the plurality of first air volume distribution door compensating values associated with the one of the plurality of temperature door opening position change angles equal to the angle formed by a change in the opening position of the right temperature door.

6. The air conditioning system of claim 5, wherein the control unit includes a calculating part calculating the angle formed by a change in the opening position of the left temperature door and the angle formed by the change in the opening position of the right temperature door by arithmetically processing a difference between a post-change opening position of the left temperature door and a pre-change opening position of the left temperature door and a difference between a post-change opening position of the right temperature door and a pre-change opening position of the right temperature door.

7. The air conditioning system of claim 3, wherein an opening position of the left temperature door and an opening position of the right temperature door is varied depending on at least one of an indoor air temperature, an outdoor air temperature, and a sunshine amount.

8. The air conditioning system of claim 4, further comprising a cold air path and a hot air path formed in the air conditioner case, the plurality of first air volume distribution door compensating values divided into a first set of first air volume distribution door compensating values and a second set of first air volume distribution door compensating values, each of the first set of first air volume distribution door compensating values associated with a corresponding one of the plurality of temperature door opening position change angles with respect to a direction of the air flowing through the cold air path, and each of the second set of first air volume distribution door compensating values associated with a corresponding one of the plurality of temperature door opening position change angles with respect to a direction of the air flowing through the hot air path.

9. The air conditioning system of claim 8, wherein the control unit selects a value from one of the first set of first air volume distribution door compensating values and the second set of first air volume distribution door compensating values, and wherein the control unit controls the angular position of the air volume distribution door in a direction towards one of the right path and the left path depending on the selected value from the first set of first air volume distribution door compensating values and the second set of first air volume distribution door compensating values.

10. The air conditioning system of claim 1, wherein the control unit selects one of the plurality of second air volume distribution door compensating values associated with the corresponding one of the plurality of main blower/auxiliary blower rotation speed level deviations equal to a deviation between a rotational speed of the main blower and a rotational speed of the auxiliary blower from the second memory part, and wherein the control unit provides a signal to the air volume distribution door to vary the angular position of the air volume distribution door depending on the selected one of the plurality of second air volume distribution door compensating values from the second memory part.

11. The air conditioning system of claim 10, wherein the control unit provides a signal to the main blower to correct the rotational speed of the main blower depending on a change in the rotational speed of the auxiliary blower.

12. The air conditioning system of claim 11, wherein the control unit includes a third memory part storing a plurality of main blower compensating values, each of the plurality of main blower compensating values associated with a corresponding one of a plurality of main blower/auxiliary blower rotation speed level deviations, and wherein the control unit selects one of the plurality of main blower compensating values associated with one of the plurality of main blower/auxiliary blower rotation speed level deviations equal to a deviation between the rotational speed of the main blower and the rotational speed of the auxiliary blower from the third memory part, and wherein the control unit provides a signal to the main blower to correct the rotational speed thereof depending on the selected one of the plurality of main blower compensating values from the third memory part.

13. The air conditioning system of claim 12, wherein a first one of the opening of the right path and the opening of the left path is greater than a second one of the opening of the right path and the opening of the left path, and wherein the control unit provides a signal to the air volume distribution door to gradually vary the angular position of the air volume distribution door in a direction towards the first one of the opening of the right path and the opening of the left path depending on the selected one of the plurality of main blower compensating values from the third memory part.

14. The air conditioning system of claim 12, wherein the signal provided to the main blower to correct the rotational speed thereof depending on the selected one of the plurality of main blower compensating values compensating values from the third memory part gradually increases the rotational speed of the main blower as the deviation between the rotational speed of the main blower and the rotational speed of the auxiliary blower increases.

15. A method for adjusting a flow of air through an air conditioning system, comprising the steps of:
providing an air conditioning system including:
an air conditioner case including a left path, a right path, and a rear seat path formed therein;
a temperature door adjusting a volume of air flowing through each of the left path, the right path, and the rear seat path;
a main blower in fluid communication with the air conditioner case and blowing the air through the left path, the right path, and the rear seat path;
an auxiliary blower in fluid communication with the rear seat path and increasing a volume and a pressure of the air flowing through the rear seat path; and
a control unit in signal communication with the main blower, the auxiliary blower, and the air volume distribution door;
detecting a change of one of an opening position of the temperature door and a rotational speed of the auxiliary blower by the control unit;
controlling the volume of the air flowing through the left path and the volume of the air through the right path by an air volume distribution door;
determining an increased deviation between a rotational speed of the main blower and a rotational speed of the auxiliary blower by the control unit, and
selecting a main blower compensating value from the control unit, and increasing the rotational speed of the main blower by the control unit.

16. The method of claim 15, further comprising the steps of selecting an air volume distribution door compensating value from the control unit and adjusting the volume of the air flowing through the left path and the volume of the air flowing through the right path based on the selected air volume distribution door compensating value with the air volume distribution door.

* * * * *